United States Patent
Park et al.

(10) Patent No.: US 8,676,251 B2
(45) Date of Patent: Mar. 18, 2014

(54) DUAL MODEM DEVICE

(75) Inventors: Soo Man Park, Gwangmyeong-si (KR); Seong Jin Park, Anyang-si (KR); Chang Jae Lee, Cheonan-si (KR)

(73) Assignee: LG Electronics Inc., Seoul (KR)

( * ) Notice: Subject to any disclaimer, the term of this patent is extended or adjusted under 35 U.S.C. 154(b) by 679 days.

(21) Appl. No.: 12/715,345

(22) Filed: Mar. 1, 2010

(65) Prior Publication Data

US 2010/0227591 A1 Sep. 9, 2010

Related U.S. Application Data

(60) Provisional application No. 61/157,207, filed on Mar. 4, 2009.

(51) Int. Cl.

| | |
|---|---|
| H04M 1/00 | (2006.01) |
| H04W 36/00 | (2009.01) |
| H04M 1/66 | (2006.01) |
| H04M 1/68 | (2006.01) |
| H04M 3/16 | (2006.01) |
| H04L 9/32 | (2006.01) |

(52) U.S. Cl.
USPC ......... 455/552.1; 455/436; 455/411; 713/171

(58) Field of Classification Search
USPC ............... 455/436, 552.1, 406, 411; 713/171; 370/329
See application file for complete search history.

(56) References Cited

U.S. PATENT DOCUMENTS

| | | | |
|---|---|---|---|
| 6,141,564 A | 10/2000 | Bruner et al. | |
| 7,489,919 B2 | 2/2009 | Cheng | |
| 2005/0058096 A1 | 3/2005 | Cheng | |
| 2007/0124818 A1* | 5/2007 | Bumiller et al. | 726/26 |
| 2008/0081592 A1* | 4/2008 | Das et al. | 455/406 |
| 2009/0239576 A1* | 9/2009 | Liao et al. | 455/552.1 |
| 2010/0075680 A1* | 3/2010 | Ramachandran et al. | 455/436 |
| 2011/0004754 A1* | 1/2011 | Walker et al. | 713/168 |
| 2011/0004762 A1* | 1/2011 | Horn | 713/171 |

FOREIGN PATENT DOCUMENTS

| | | |
|---|---|---|
| CN | 101272251 | 9/2008 |
| DE | 10108056 | 8/2002 |
| WO | 02/067610 | 8/2002 |

* cited by examiner

Primary Examiner — Opiribo Georgewill
(74) Attorney, Agent, or Firm — Lee, Hong, Degerman, Kang & Waimey

(57) ABSTRACT

A dual modem device is disclosed. The present invention includes a first processor configured to communicate with a first communication network, a second processor configured to communicate with a second communication network, and a subscriber identity module configured to store a user equipment identifier corresponding to the first communication network, at least one authentication parameter corresponding to the first communication network and an authentication algorithm corresponding to the first communication network, the subscriber identity module performing the authentication algorithm corresponding to the first communication network, wherein the subscriber identity module is connected to the second processor. The first communication network is an LTE (long term evolution) communication network. And, the second communication network is an eHRPD (enhanced high-rate packet data) communication network.

15 Claims, 11 Drawing Sheets

DUAL MODEM DEVICE

This application claims the benefit of the U.S. Provisional Patent Application No. 61/157,207, filed on Mar. 4, 2009, which is hereby incorporated by reference as if fully set forth herein.

BACKGROUND OF THE INVENTION

1. Field of the Invention

The present invention relates to a dual modem device, and more particularly, to a dual modem device capable of transmitting and receiving CDMA or LTE signals. Although the present invention is suitable for a wide scope of applications, it is particularly suitable for enabling a dual modem device to effectively perform authentication.

2. Discussion of the Related Art

Generally, high-speed data transceiving is ongoing to evolve in wireless mobile communication field as well as speech call. And, the $4^{th}$ generation mobile communication technology such as LTE (long term evolution) wireless communication system is attracting attention. Yet, while the $4^{th}$ generation communication network and the previously commercialized $3^{rd}$ generation communication network are coexisting, a mobile communication terminal or a mobile communication data cart needs to simultaneously include the 3G mobile communication technology, which has been commercialized and keeps being widely used so far, as well as the $4^{th}$ generation mobile communication technology. In order to simultaneously support a next generation mobile communication technology and a previous generation mobile communication technology, a mobile terminal having a dual modem processor or a device of a data card type (hereinafter called a dual modem device) is necessary.

The dual modem device is loaded with two modems differing from each other in communication system and is able to support wireless communications using the modems, respectively. The dual modem device is mainly used in area where heterogeneous communication networks coexist. As a representative example of the dual modem device, a device available for LTE (long term evolution) wireless communication and CDMA (code divisional multiple access) wireless communication both is receiving wide attention. The present invention relates to a dual modem device capable of communications with LTE network and CDMA network both for example. And, it is apparent to those skilled in the art that the present invention should apply to other wireless communication system as well.

The dual modem device, and more particularly, a dual modem data card is connected as a dongle form to a personal computer (PC) and comes into spotlight by playing a role as a means for replacing a wireless LAN (local area network) card.

SUMMARY OF THE INVENTION

Accordingly, the present invention is directed to a dual modem device that substantially obviates one or more problems due to limitations and disadvantages of the related art.

An object of the present invention is to provide a dual modem device, by which authentication can be effectively performed on heterogeneous networks.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a dual modem device according to the present invention includes a first processor configured to communicate with a first communication network, a second processor configured to communicate with a second communication network, and a subscriber identity module configured to store a user equipment identifier corresponding to the first communication network, at least one authentication parameter corresponding to the first communication network and an authentication algorithm corresponding to the first communication network, the subscriber identity module performing the authentication algorithm corresponding to the first communication network, wherein the subscriber identity module is connected to the second processor.

Preferably, the first communication network is an LTE (long term evolution) communication network and the second communication network is an eHRPD (enhanced high-rate packet data) communication network.

More preferably, the user equipment identifier is an IMSI (international Mobile Subscriber Identity) value.

More preferably, the authentication algorithm corresponding to the first communication network is an EPS-AKA (Evolved Packet System-authentication and key agreement] algorithm.

Preferably, the subscriber identity module includes a USIM (universal subscriber identity module).

Preferably, the subscriber identity module further stores a user equipment identifier corresponding to the second communication network, at least one authentication parameter corresponding to the second communication network and an authentication algorithm corresponding to the second communication network and the subscriber identity module further performs the authentication algorithm corresponding to the second communication network.

Preferably, the dual modem device further includes an eHRPD communication network dedicated subscriber identity module configured to store a user equipment identifier corresponding to the eHRPD communication network, at least one authentication parameter corresponding to the eHRPD communication network and an authentication algorithm corresponding to the eHRPD communication network. And, the eHRPD communication network dedicated subscriber identity module performs the authentication algorithm corresponding to the eHRPD communication network.

More preferably, the authentication algorithm corresponding to the eHRPD communication network is an EAP-AKA' (extensible authentication protocol-authentication and key agreement prime] algorithm.

Preferably, the dual modem device further includes an IPC (Interprocess Communication) interface module configured to connect the first processor and the second processor to each other, such as SDIO (Secure Digital Input Output), USB, Shared memory, UART, and so on.

More preferably, the first processor delivers AUTN (authentication token) and RAND (random challenge) values received from the LTE communication network to the subscriber identity module via the second processor, the subscriber identity module generates an RES (response), an IK (integrity key) and a CK (ciphering key) by performing an AKA algorithm using the AUTN and RAND values as factors, and the subscriber identity module delivers the RES, the IK and the CK to the first processor via the second processor. In this case, the first processor transmits the RES to the LTE communication network.

More preferably, the second processor delivers AUTN (authentication token) and RAND (random challenge) received from the eHRPD communication network to the subscriber identity module, the subscriber identity module generates an RES (response), an IK (integrity key) and a CK (ciphering key) by performing an AKA algorithm using the AUTN and RAND values as factors, and the subscriber identity module delivers the RES, the IK and the CK to the second processor. In this case, the second processor generates an IK' and a CK' using the IK and the CK, and then transmits the RES to the eHRPD communication network.

Preferably, the dual modem device further includes a CSIM (CDMA subscriber identity module) configured to store a user equipment identifier corresponding to a legacy CDMA communication network and at least one authentication parameter corresponding to the legacy CDMA communication network and the second processor further includes a third communication module configured to communicate with the legacy communication network.

In another aspect of the present invention, a dual modem device includes a first processor configured to communicate with a first communication network and a second processor configured to communicate with a second communication network, wherein the first processor stores a user equipment identifier corresponding to the first communication network, at least one authentication parameter corresponding to the first communication network and an authentication algorithm corresponding to the first communication network, wherein the first processor performs the authentication algorithm corresponding to the first communication network, wherein the second processor stores a user equipment identifier corresponding to the second communication network, at least one authentication parameter corresponding to the second communication network and an authentication algorithm corresponding to the second communication network, and wherein the second processor performs the authentication algorithm corresponding to the second communication network.

Accordingly, the present invention provides the following effects and/or advantages.

First of all, a dual modem terminal can perform authentication more efficiently. Particularly, if a host processor is a CDMA processor, authentication can be performed more effectively.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, they are applicable to other random mobile communication systems except unique features of 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS) and the like and that a base station is a common name of such a random node of a network stage communicating with a terminal or device as a node B, eNode B, a base station and the like.

CDMA communication networks mentioned in the following description are classified into a legacy CDMA communication network and an eHRPD (enhanced high-rate packet data) communication network. The legacy CDMA communication network means CDMA 1x-RTT (radio transmission technology) or CDMA EV-DO (evolution data optimized). And, the eHRPD communication network is 3GPP2 based communication network, which is enhanced to perform handover into LTE communication network.

Figure 1:
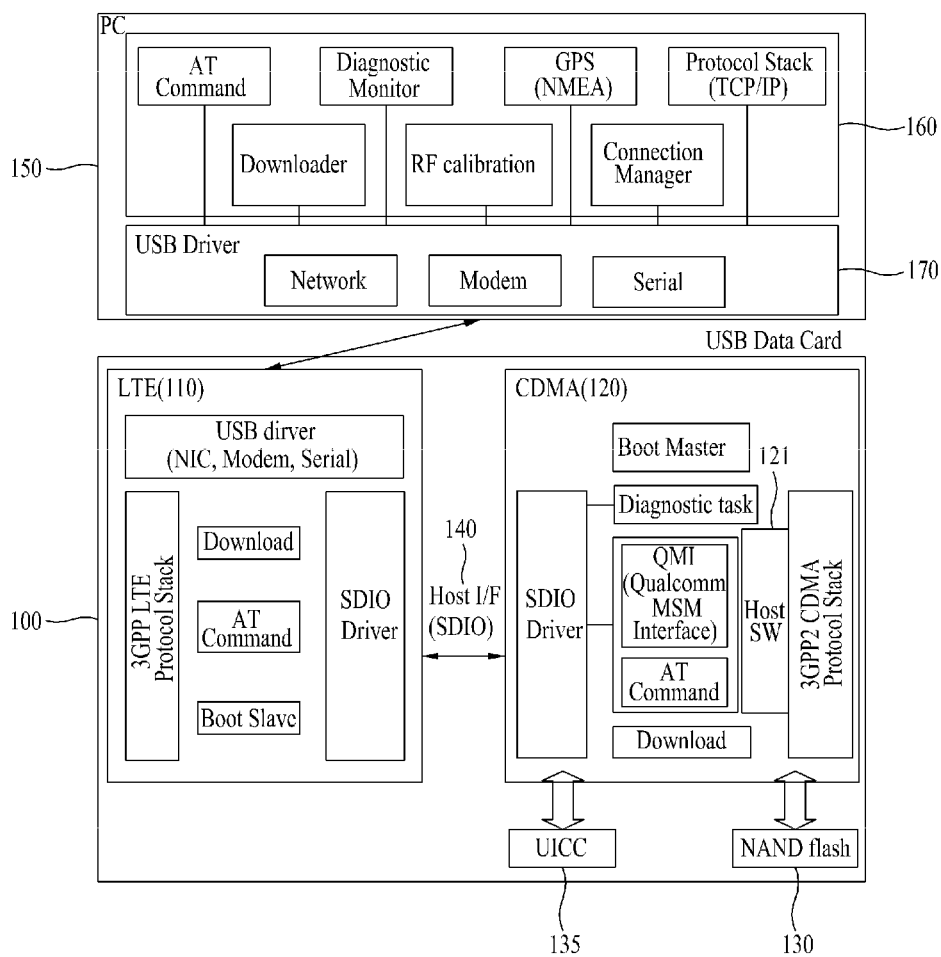
FIG. 1 is a block diagram for a structure of a communication system including a dual modem device according to an embodiment of the present invention and a personal computer (PC)

FIG. 1 is a block diagram for a structure of a communication system including a dual modem device according to an embodiment of the present invention and a personal computer (PC). Specifically, in FIG. 1, a dual modem device includes a device of a USB data card type for example. And, it is apparent to those skilled in the art, to which the present invention pertains, that the dual modem device can include a device of any type accessible to a heterogeneous network by having a plurality of modems.

Referring to FIG. 1, a dual modem device 100 of a communication system according to the present invention includes a CDMA processor 120 responsible for communication with a CDMA communication network and an LTE processor 110 responsible for communication with an LTE communication network. In this case, the LTE processor 110 plays a role in relaying all CDMA control or data signals the CDMA processor 120 transceives with a PC 150. The dual modem device 100 includes a NAND flash memory 130 as a storage means for the device. And, the NAND flash memory 130 is connected to the CDMA processor 120 that is a host processor.

The LTE processor 110 transmits/receives signals to/from the PC 150 using a USB interface. And, signals are delivered between the CDMA processor 120 and the LTE processor 110 using a secure digital input output (SDIO) that is an IPC (Interprocess Communication) interface 140, such as SDIO (Secure Digital Input Output), USB, Shared memory, UART, and so on.

A configuration of the PC 150 of the communication system of the present invention is explained as follows. First of all, various PC applications 160 are run in the PC 150 to communicate with the dual modem device 100 or control the dual modem device 100. Moreover, a USB driver 170 configured to provide an interface for transceiving data or control signals between the PC 150 and the dual modem device 100 is included in the PC 150.

A host control module 121 is provided to the CDMA processor 120 and is responsible for inter-RAT (radio access technology) handover control, inter-RAT signal quality control, service control, QoS (quality of service) control, IP (internet protocol) address session control and the like.

Since the host process is the CDMA processor 120 in FIG. 1, a UICC (universal integrated circuit card) 135 is connected to the CDMA processor 120. And, the host control module 121 included in the CDMA processor 120 controls the UICC 135. Yet, although the host processor is either the LTE processor 110 or the CDMA processor 120, the UICC 130 can be connected to the LTE processor 110. In this case, it can be understood that its configuration is modifiable as well.

In particular, the UICC 135 includes a USIM (universal subscriber identity module), a CSIM (CDMA subscriber identity module) and an ISIM (IP multimedia services identity module). Generally, the USIM includes network parameters relevant to the LTE communication network, authentication associated applications and the like. And, the CSIM includes network parameters relevant to the CDMA communication network, authentication associated applications and the like. Moreover, the ISIM includes parameters and applications for providing IP multimedia services.

For clarity, the following description is made with reference to the configuration of the dual modem device shown in FIG. 1 unless special mention.

Figure 2:
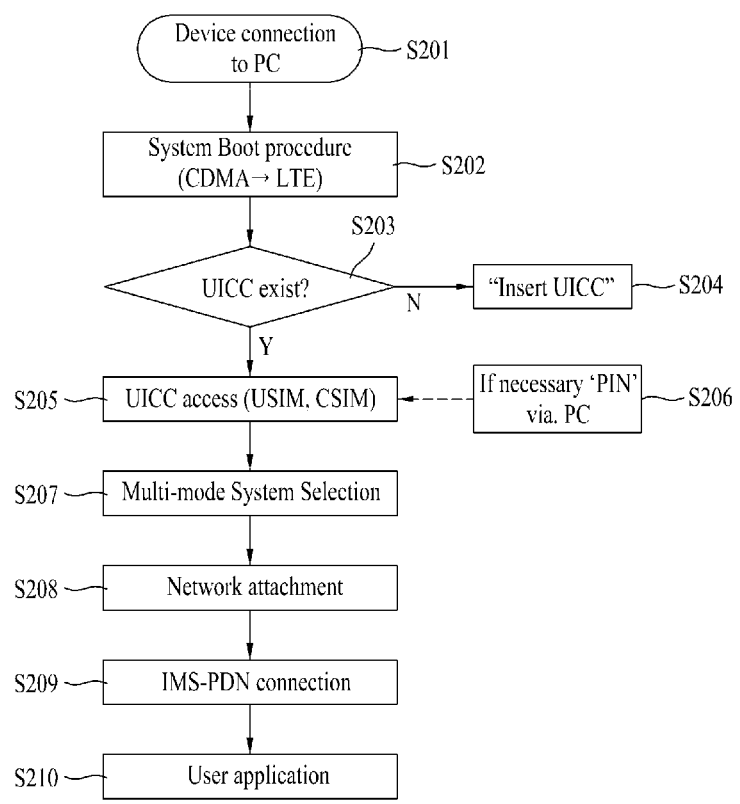
FIG. 2 is a flowchart for explaining a booting procedure of a dual modem device according to an embodiment of the present invention.

FIG. 2 is a flowchart for explaining a booting procedure of a dual modem device according to an embodiment of the present invention.

Referring to FIG. 2, in a step S201, a PC and a dual modem device are connected to each other using a USB interface. And, a system booting procedure of the dual modem device proceeds in a step S202. The system booting procedure is explained in detail as follows. First of all, if an SDIO, which is the IPC interface between an LTE processor and a CDMA processor, is initialized, the LTE processor stands by until receiving a signal for obtaining synchronization from the CDMA processor. Once the initialization of the CDMA processor is completed, an LTE image stored in a NAD flash memory of the CDMA processor, i.e., an LTE processor drive program is delivered to the LTE processor via the SDIO to complete an initialization of the LTE processor.

Subsequently, in a step S203, the CDMA processor determines whether a UICC including a USIM, a CSIM and an ISIM is connected. If the UICC is not connected, the CDMA processor makes a request for a connection of the UICC to a user in a step S204. If the UICC is connected, the CDMA processor performs a UICC initialization and then drives the USIM and the CSIM, in a step S205. In this case, if necessary, a PIN (personal identification number) can be inputted from a PC in a step S206.

In a step S207, a communication network to access is selected according to a selection made by a user or a pre-stored setting. In a step S208, the selected communication network is accessed.

Meanwhile, if the accessed communication network is an LTE communication network or an eHRPD communication network, an IMS (IP multimedia subsystem) PDN (packet data network) is connected in the step S208 using IPv6 protocol so that SMS (short message service) can be transceived. After the IMS PDN has been activated, an internet PDN is automatically connected so that applications can be driven via internet in a step S209.

Figure 3:
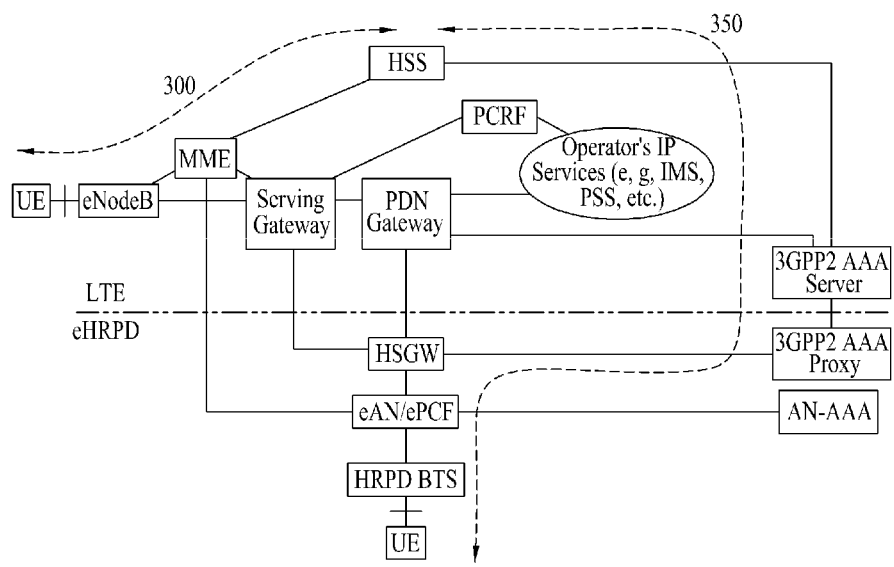
FIG. 3 is a diagram for structures of LTE communication network and eHRPD communication network.

FIG. 3 is a diagram for structures of LTE communication network and eHRPD communication network.

Referring to FIG. 3, in order for a user equipment (UE) to perform authentication by accessing an LTE communication network, the authentication is performed through an eNodeB, an MME (mobile management entity) and an HSS (home subscriber server) like a path 300. In this case, EPS-AKA (Evolved Packet System-authentication and key agreement) is used as a scheme of the authentication.

Meanwhile, in case that the user equipment (UE) performs authentication by accessing an eHRPD communication network, the authentication is performed through an HRPD BTS, an HSGW (HPRD serving gateway), a 3GPP2 AAA (authentication, authorization and accounting) proxy, a 3GPP2 AAA server and HSS(Home Subscriber Server). And, EAP-AKA' (authentication and key agreement prime) is used as a scheme of the authentication.

In the following description, authentication schemes performed in an eHRPD communication network and an LTE communication network are explained with reference to FIG. 3, respectively.

Figure 4:
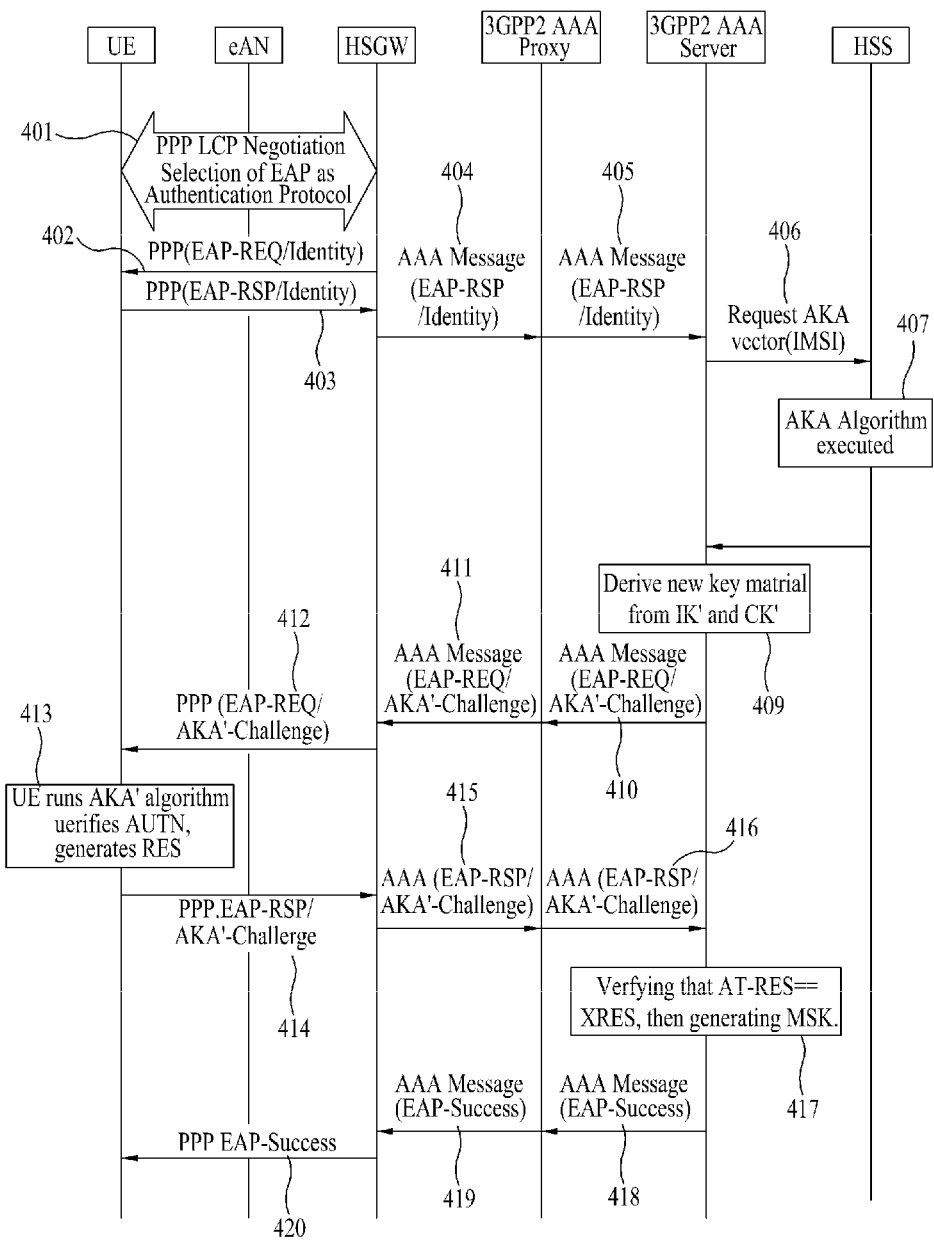
FIG. 4 is a flowchart for schematically explaining EAP-AKA' as an authentication scheme in eHRPD communication network.

FIG. 4 is a flowchart for schematically explaining EAP-AKA' as an authentication scheme in eHRPD communication network.

Referring to FIG. 4, PPP (point-to-point protocol) LCP (link control protocol) negotiation is generated in a step 401. And, EAP (extensible authentication protocol) is selected as an authentication protocol. In a step 402, an HSGW sends an EAP-request/identity message to a UE. In a step 403, the UE sends an EAP-response/identity message to the HSGW in response to the EAP-request/identity message. In a step 404, the HSGW forwards the EAP-response/identity message to a 3GPP2 AAA proxy. In a step 405, the 3GPP2 AAA proxy forwards the EAP-response/identity message to a 3GPP2 AAA server.

In a step 406, the 3GPP2 AAA server makes a request for an AKA vector using an IMSI (international mobile subscriber identity) value of the UE to an HSS. In a step 407, the HSS calculates the AKA vector and then modifies the calculated AKA vector as disclosed in TS 33.402. In this case, the modified AKA vector is represented as an AKA' vector. Subsequently, in a step 408, the HSS makes a response in a manner of delivering the AKA' vector including a RAND (random value), an AUTN (authentication token) and an XRES (expected response), an IK' (integrity key)' and a CK' (ciphering key)' to the 3GPP AAA server. And, the 3GPP2 AAA server stores the AKA' vector delivered from the HSS. In a step 409, the 3GPP2 AAA sever generates a new keying material using the IK' and the CK' according to the EAP-AKA'. In this case, the 3GPP2 AAA server is able to select a pseudonym ID and/or a re-authentication ID, which can be protected by the generated new keying material.

Subsequently, in a step 410, the 3GPP2 AAA server delivers an EAP-request/AKA'-challenge message including RAND and AUTN to the 3GPP2 AAA proxy. In a step 411, the 3GPP2 AAA proxy delivers the EAP-request/AKA'-challenge message to the HSGW. In a step 412, the HSGW delivers the EAP-request/AKA'-challenge message to the UE. Subsequently, in a step 413, the UE verifies an AUTN value by driving AKA' algorithm. If the AUTN value is verified, the UE calculates the IK' and the CK' and then generates an MSK that is a new keying material. In particular, the process of the step 413 is performed in a SUIM included in the UE.

In a step 414, the UE calculates a new MAC (message authentication code) value to use for an EAP message transmission. The UE then delivers an RES, a new MAC and an EAP response/AKA'-challenge to the HSGW. In a step 415, the HSGW converts AT-RES, AT-MAC and EAP response/AKA'-challenge message to an AAA message and then delivers it to the 3GPP2 AAA proxy. In a step 416, the 3GPP2 AAA proxy delivers it to the 3GPP2 AAA server. Subsequently, in a step 417, the 3GPP2 AAA server verifies the AT-RES by comparing it with an XRES.

If the verification is successful, the 3GPP2 AAA server generates an EAP-success message including a searched subscriber profile and an MSK and then delivers it to the 3GPP2 AAA proxy, in a step 418. In a step 419, the 3GPP2 AAA delivers it to the HSGW. Finally, in a step 420, the HSGW delivers the EAP-success message to the UE.

Figure 5:
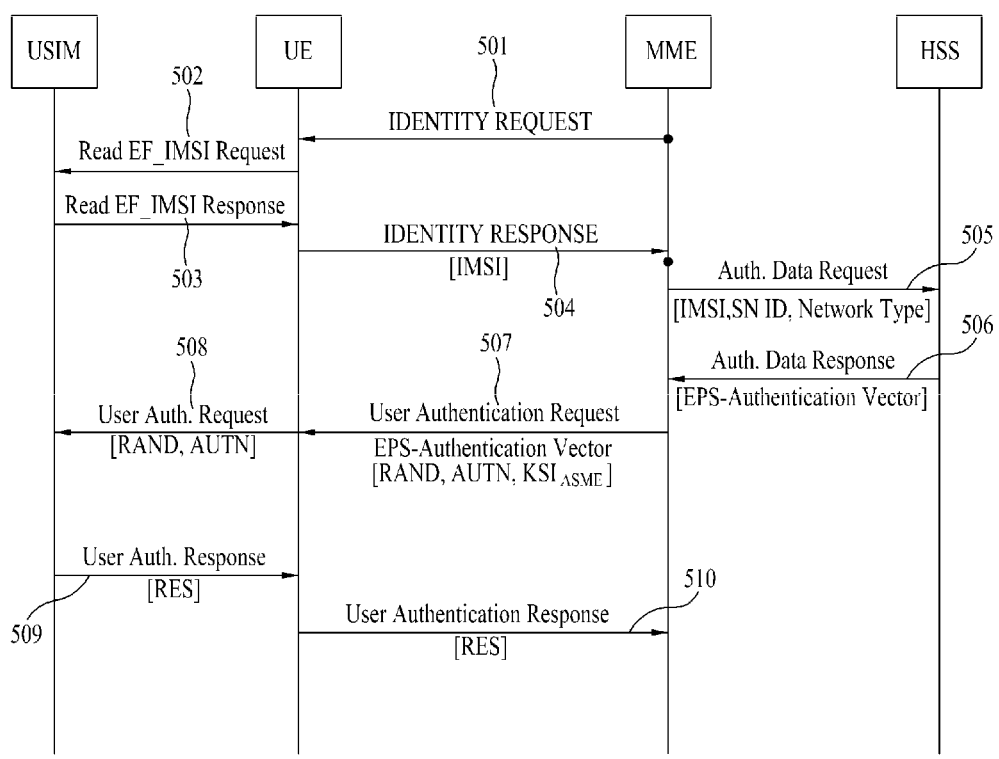
FIG. 5 is a flowchart for schematically explaining EPS-AKA as an authentication scheme in LTE communication network.

FIG. 5 is a flowchart for schematically explaining EPS-AKA as an authentication scheme in LTE communication network.

Referring to FIG. 5, in a step 501, EPS-AKA, which is an authentication scheme in an LTE communication network, is initiated if an MME makes a request for an IMSI value by sending an identity request message to a UE. If so, the UE delivers a read EF_IMSI request to a USIM in a step 502. The USIM delivers the IMSI value in response by sending a read EF_IMSI response message in a step 503. In a step 504, the UE delivers the IMSI value to the MME by sending an identity response message.

In a step 505, the MME delivers an authentication data request message to an HSS. In this case, the authentication data request message includes information on the IMSI value, an ID of a serving network and a network type. In a step 506, the HSS generates a EPS-Authentication Vector and makes a response including the EPS-Authentication Vector. In this case, the EPS-Authentication Vector includes informations shown in Table 1.

TABLE 1

[EPS Authentication Vector]

AV (Authentication Vector) = [RAND || XRES || CK || IK || AUTN]
AUTN (Authentication Token) = [SQN ⊕ AK || AMF || MAC]

Subsequently, in a step 507, the MME sends a user authentication request message including an RAND and an AUTN to the UE. In a step 508, the UE forwards this message to the USIM or a user authentication reject message to the MME. More specifically, if bit0 of a AMF value of the AUTN is not 1, the UE transfers the user authentication reject message to the MME. Further, if bit0 of a AMF value of the AUTN is 1, the UE delivers an RAND and an AUTN to the USIM to enable AKA algorithm to proceed.

The USIM generates an IK and a CK using the RAND and the AUTN, and also performs verification of the AUTN. If the verification of the AUTN is successful, the USIM generates an RES. Subsequently, the USIM transfers a user authentication response message to the UE, in a step 509. The UE then completes the authentication by sending a user authentication response message including the RES to the MME in a step 510.

Figure 6:
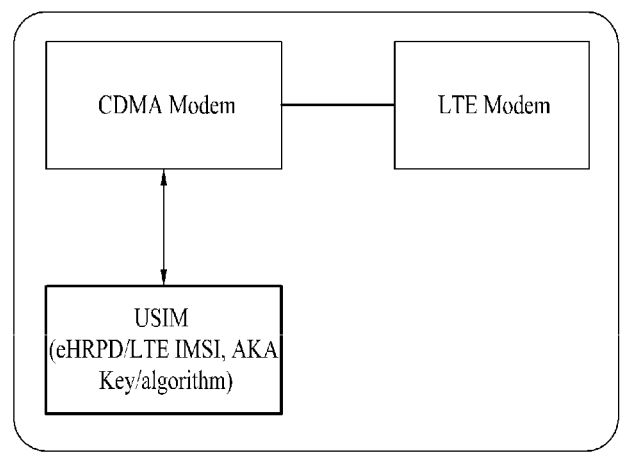
FIG. 6 is a diagram for a structure of a dual mode device, in which a UICC according to one embodiment of the present invention is connected to a CDMA processor.

FIG. 6 is a diagram for a structure of a dual mode device, in which a UICC according to one embodiment of the present invention is connected to a CDMA processor. For clarity of the following description, FIG. 6 shows that a USIM corresponding to an LTE and an eHRPD is included in a UICC only. And, the following description is made on the assumption that a CDMA processor is a host processor in a following dual mode device. Yet, an LTE processor is operable as a host processor. And, it is apparent to those skilled in the art that a detailed configuration can be modified to correspond to the LTE processor operable as the host processor.

Referring to FIG. 6, a USIM includes an IMSI, AKA key and AKA algorithm used for authentication procedures of LTE and eHRPD. The LTE and the eHRPD use the same IMSI value and the same AKA key. And, a legacy CDMA uses a value equal to the IMSI value stored in the USIM or may use a value different from the IMSI value stored in the USIM.

In particular, after a device has been booted, a CDMA processor obtains an IMSI value for eHRPD user identity from the USIM. And, an LTE processor obtains an IMSI value for LTE user identity from the USIM via the CDMA processor.

If the authentication procedure of the eHRPD is performed, the CDMA processor inputs authentication parameters (e.g., AUTN, RAND) received from a CDMA communication network to the USIM. The USIM generates an RES, an IK and a CK using AKA algorithm and then delivers the generated RES, IK and CK to the CDMA processor. Moreover, the CDMA processor generates a IK' and a CK' using the IK and CK, and then transmits the RES to the CDMA network to enable a verification procedure of the RES value to be performed.

Meanwhile, if the authentication procedure of the LTE is performed, the LTE processor inputs authentication parameters received from an LTE communication network to the USIM via the CDMA processor. The USIM generates an RES, an IK and a CK using AKA algorithm and then delivers the generated RES, IK and CK to the LTE processor via the CDMA processor. Moreover, the LTE processor transmits the RES to the LTE network to enable a verification procedure of the RES value to be performed.

Furthermore, an authentication procedure of legacy CDMA is generally performed using authentication parameters included in a CSIM of a UICC. Alternatively, the authentication parameters of the legacy CDMA can be implemented in a manner of being stored in an inactive memory of a dual modem device.

Figure 7:
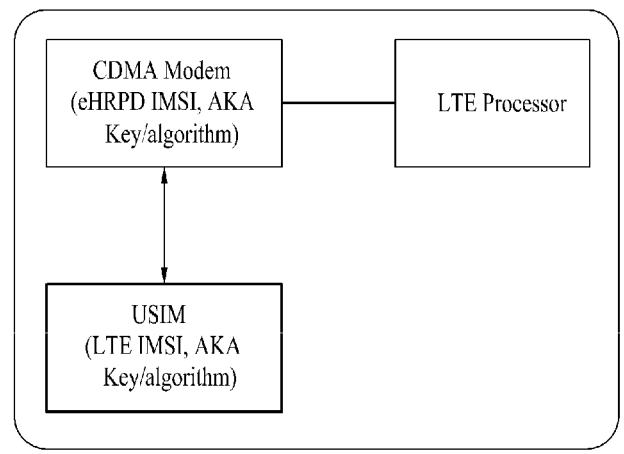
FIG. 7 is a diagram for a structure of a dual mode device, in which a UICC according to another embodiment of the present invention is connected to a CDMA processor.

FIG. 7 is a diagram for a structure of a dual mode device, in which a UICC according to another embodiment of the present invention is connected to a CDMA processor.

Referring to FIG. 7, a USIM includes an IMSI, an AKA key and AKA algorithm used for an authentication procedure of LTE. The LTE and eHRPD use different IMSI values and AKA keys, respectively. A legacy CDMA uses the same value of the IMSI value used for an authentication procedure of the eHRPD.

After a device has been booted, an LTE processor obtains an IMSI value for LTE user identity from the USIM via a CDMA processor. Once the authentication procedure of the eHRPD is performed, the CDMA processor generates an RES, an IK' and a CK' using EAP-AKA' algorithm and authentication parameters received from a CDMA communication network. And, the CDMA processor transmits the RES to the CDMA network to enable a verification procedure of the RES value to be performed.

If the authentication procedure of the LTE is performed, the LTE processor inputs authentication parameters received from an LTE communication network to the USIM via the CDMA processor. The USIM generates an RES, an IK and a CK using AKA algorithm and then delivers the generated RES, IK and CK to the LTE processor via the CDMA processor. And, the LTE processor transmits the RES to the LTE network to enable a verification procedure of the RES value to be performed.

Figure 8:
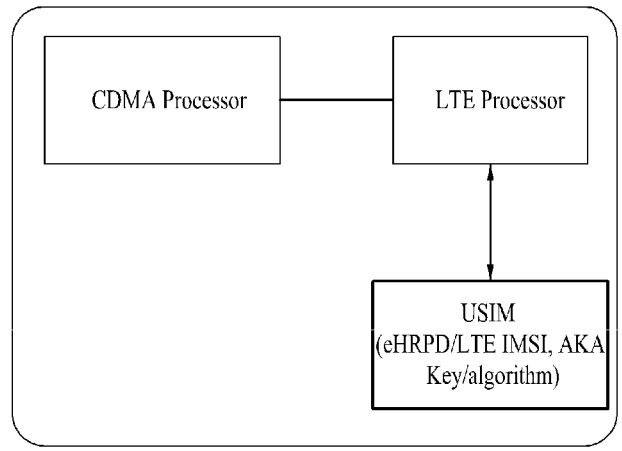
FIG. 8 is a diagram for a structure of a dual mode device, in which a UICC according to a further embodiment of the present invention is connected to a LTE processor.

FIG. 8 is a diagram for a structure of a dual mode device, in which a UICC according to a further embodiment of the present invention is connected to a LTE processor.

Referring to FIG. 8, a USIM includes an IMSI, an AKA key and AKA algorithm used for an authentication procedure of LTE and eHRPD. The LTE and the eHRPD use the same IMSI value and the same AKA key. And, a legacy CDMA uses a value equal to the IMSI value stored in the USIM or may use a value different from the IMSI value stored in the USIM.

A CDMA processor obtains an IMSI value for eHRPD user identity from the USIM via an LTE processor. The LTE processor obtains directly an IMSI value for LTE user identity from the USIM.

Once the authentication procedure of the eHRPD is performed, the CDMA processor inputs authentication parameters received from a CDMA communication network to the USIM. Then the USIM generates an RES, an IK and a CK using the AKA algorithm and the authentication parameters and then transfers the generated RES, IK and CK to the CDMA processor via the LTE processor.

On the other hand, if the authentication procedure of the LTE is performed, since the CDMA processor is a host processor, authentication parameters received from an LTE communication network are delivered to the CDMA processor from the LTE processor and are then delivered to the LTE processor from the CDMA processor to be inputted to the USIM. The USIM generates an RES, an IK and a CK using the AKA algorithm. The generated RES, IK and CK are delivered to the CDMA processor via the LTE processor and are then delivered to the LTE processor via the CDMA processor again.

Figure 9:
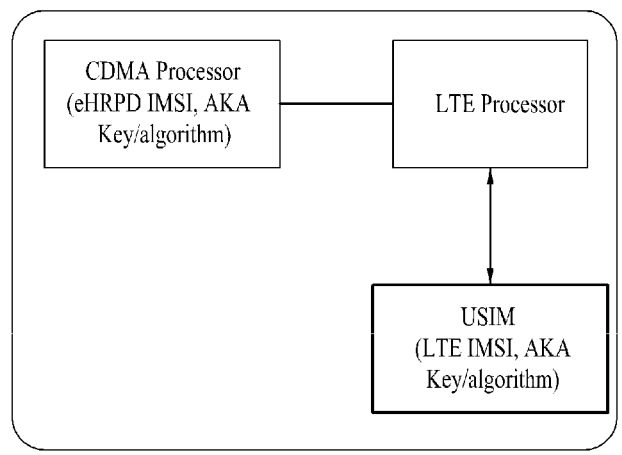
FIG. 9 is a diagram for a structure of a dual mode device, in which a UICC according to another embodiment of the present invention is connected to an LTE processor.

FIG. 9 is a diagram for a structure of a dual mode device, in which a UICC according to another embodiment of the present invention is connected to an LTE processor.

Referring to FIG. 9, a USIM includes an IMSI, AKA key and AKA algorithm used for authentication procedures of LTE. The LTE and eHRPD use different IMSI values and AKA keys, respectively. A legacy CDMA uses the same value of the IMSI value used for an authentication procedure of the eHRPD.

A CDMA processor obtains an IMSI value for eHRPD user identity from a non-volatile memory. If the authentication procedure of the eHRPD is performed, the CDMA processor generates an RES, an IK' and a CK' using EAP-AKA' algorithm and authentication parameters received from a CDMA communication network. And, the CDMA processor transmits the RES to the CDMA network to enable a verification procedure of the RES value to be performed.

If the authentication procedure of the LTE is performed, since the CDMA processor is a host processor, authentication parameters received from an LTE communication network are delivered to the CDMA processor from the LTE processor and are then delivered to the LTE processor again to be inputted to the USIM. Subsequently, the USIM generates an RES, an IK and a CK. The RES, IK and CK generated from the USIM are delivered to the CDMA processor via the LTE processor and are then delivered to the LTE processor via the CDMA processor again.

Figure 10:
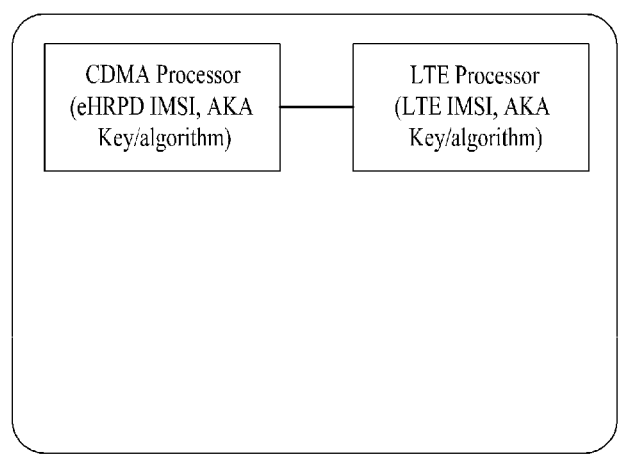
FIG. 10 is a diagram for a structure of a dual mode device, in which information required for an authentication process does not exist according to an embodiment of the present invention.

FIG. 10 is a diagram for a structure of a dual mode device, in which information required for an authentication process does not exist according to an embodiment of the present invention.

Referring to FIG. 10, each processor includes an IMSI, an AKA key and AKA algorithm used for a corresponding authentication procedure. The LTE and the eHRPD use different IMSI value and AKA key, respectively. A legacy CDMA uses the same value of the IMSI value used for an authentication procedure of the eHRPD.

Figure 11:
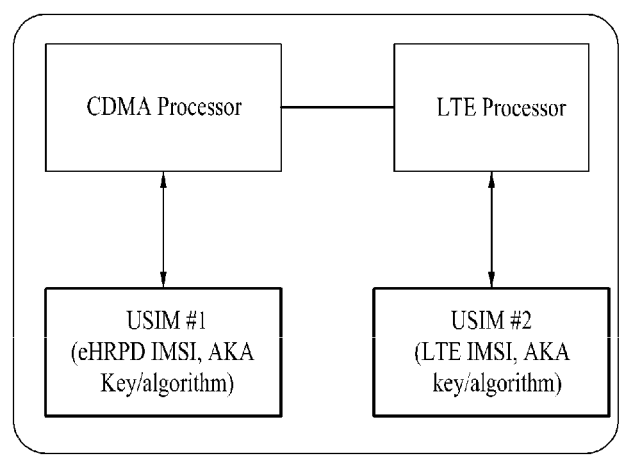
FIG. 11 is a diagram for a structure of a dual mode device according to an embodiment of the present invention, in which UICCs are connected to processors, respectively.

FIG. 11 is a diagram for a structure of a dual mode device according to an embodiment of the present invention, in which UICCs are connected to processors, respectively. FIG. 11 shows a case that a plurality of UICCs exist and that a USIM exists in each of a plurality of the UICCs. Alternatively, two USIMs can exist in one UICC.

Referring to FIG. 11, a USIM #1 indicates an eHRPD dedicated USIM. A USIM #2 indicates an LTE dedicated USIM. And, each of the USIMs includes an IMSI, an AKA key and AKA algorithm used for a corresponding authentication procedure. LTE and eHRPD use different or same IMSI values and AKA keys. Preferably, a legacy CDMA uses the same value of the IMSI value used for an authentication procedure of the eHRPD.

The above-described embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, embodiments of the present invention are described centering on the data transmission/reception relations between a base station and a terminal. In this disclosure, a specific operation explained as performed by a base station can be performed by an upper node of the base station in some cases. In particular, in a network constructed with a plurality of network nodes including a base station, it is apparent that various operations performed for communication with a terminal can be performed by a base station or other networks except the base station. In this case, 'base station' can be replaced by such a terminology as a fixed station, a Node B, an eNode B (eNB), an access point and the like. And, 'terminal' can be replaced by such a terminology as a user equipment (UE), a mobile station (MS), a mobile subscriber station (MSS)' and the like.

Embodiments of the present invention can be implemented using various means. For instance, embodiments of the present invention can be implemented using hardware, firmware, software and/or any combinations thereof In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A dual modem device comprising:
a first processor configured to communicate with a first communication network;
a second processor configured to communicate with a second communication network; and
a subscriber identity module connected to the second processor and configured to:
store a user equipment identifier corresponding to the first communication network, at least one authentication parameter corresponding to the first communication network and an authentication algorithm corresponding to the first communication network; and
perform the authentication algorithm corresponding to the first communication network,
wherein the first processor is connected with a personal computer and is configured to transmit and receive control signals and data signals with the personal computer and to relay the control signals and data signals to the second processor.

2. The dual modem device of claim 1, wherein the first communication network is an LTE (long term evolution) communication network and wherein the second communication network is an eHRPD (enhanced high-rate packet data) communication network.

3. The dual modem device of claim 2, wherein the user equipment identifier is an IMSI (international mobile subscriber identity) value.

4. The dual modem device of claim 2, wherein the authentication algorithm corresponding to the first communication network is an EPS-AKA (evolved system-authentication and key agreement) algorithm.

5. The dual modem device of claim 1, wherein the subscriber identity module includes a USIM (universal subscriber identity module).

6. The dual modem device of claim 1, wherein the subscriber identity module is further configured to:
store a user equipment identifier corresponding to the second communication network, at least one authentication parameter corresponding to the second communication network and an authentication algorithm corresponding to the second communication network; and
perform the authentication algorithm corresponding to the second communication network.

7. The dual modem device of claim 2, further comprising an eHRPD communication network dedicated subscriber identity module configured to:
store a user equipment identifier corresponding to the eHRPD communication network, at least one authentication parameter corresponding to the eHRPD communication network and an authentication algorithm corresponding to the eHRPD communication network; and
perform the authentication algorithm corresponding to the eHRPD communication network.

8. The dual modem device of claim 7, wherein the authentication algorithm corresponding to the eHRPD communication network is an EAP-AKA' (extensible authentication protocol-authentication and key agreement prime) algorithm.

9. The dual modem device of claim 3, further comprising an IPC (Interprocess Communication) interface module configured to connect the first processor and the second processor to each other.

10. The dual modem device of claim 4, wherein:
the first processor is further configured to deliver AUTN (authentication token) and RAND (random challenge) values received from the LTE communication network to the subscriber identity module via the second processor; and
the subscriber identity module is further configured to generate an RES (response), an IK (integrity key) and a CK (ciphering key) by performing an AKA algorithm using the AUTN and RAND values as factors and to deliver the RES, the IK and the CK to the first processor via the second processor.

11. The dual modem device of claim 10, wherein the first processor is further configured to transmit the RES to the LTE communication network.

12. The dual modem device of claim 7, wherein:
the second processor is further configured to deliver AUTN (authentication token) and RAND (random challenge) values received from the eHRPD communication network to the subscriber identity module; and
the subscriber identity module is further configured to generate an RES (response), an IK (integrity key) and a CK (ciphering key) by performing an AKA (authentication and key agreement) algorithm using the AUTN and RAND values as factors and to deliver the RES, the IK and the CK to the second processor.

13. The dual modem device of claim 12, wherein the second processor is further configured to transmit the RES to the eHRPD communication network.

14. The dual modem device of claim 2, further comprising a CSIM (CDMA (code divisional multiple access) subscriber identity module) configured to store a user equipment identifier corresponding to a legacy CDMA communication network and at least one authentication parameter corresponding to the legacy CDMA communication network and wherein the second processor includes a communication module configured to communicate with the legacy CDMA communication network.

15. The dual modem device of claim 1, wherein the second processor includes a host module configured to control the first processor.

* * * * *